United States Patent [19]  
Elikan et al.

[11] 3,966,873  
[45] June 29, 1976

[54] URANIUM COMPLEX RECYCLING METHOD OF PURIFYING URANIUM LIQUORS

[75] Inventors: Leonard Elikan, Pittsburgh; Ward L. Lyon, Monroeville; Parameshwaran S. Sundar, Pittsburgh, all of Pa.

[73] Assignee: Westinghouse Electric Corporation, Pittsburgh, Pa.

[22] Filed: Nov. 1, 1973

[21] Appl. No.: 411,886

[52] U.S. Cl. .................................... 423/10; 423/8; 423/11; 423/15; 423/260; 423/261; 423/253
[51] Int. Cl.[2] .................... C01G 43/00; C01G 43/02
[58] Field of Search ............. 423/8, 10, 11, 15, 253, 423/260, 261

[56] References Cited
UNITED STATES PATENTS

| 3,052,513 | 9/1962 | Crouse | 423/10 X |
|---|---|---|---|
| 3,052,514 | 9/1962 | Schmitt | 423/10 |
| 3,214,239 | 10/1965 | Hazen et al. | 423/10 |
| 3,711,591 | 1/1973 | Hurst et al. | 423/10 |
| 3,737,513 | 6/1973 | Wiewiorowski et al. | 423/8 |
| 3,835,214 | 9/1974 | Hurst et al. | 423/10 |

*Primary Examiner*—Benjamin R. Padgett
*Assistant Examiner*—Edward A. Miller
*Attorney, Agent, or Firm*—R. D. Fuerle

[57] ABSTRACT

Uranium is separated from contaminating cations in an aqueous liquor containing uranyl ions. The liquor is mixed with sufficient recycled uranium complex to raise the weight ratio of uranium to said cations preferably to at least about three. The liquor is then extracted with at least enough non-interfering, water-immiscible, organic solvent to theoretically extract about all of the uranium in the liquor. The oganic solvent contains a reagent which reacts with the uranyl ions to form a complex soluble in the solvent. If the aqueous liquor is acidic, the organic solvent is then scrubbed with water. The organic solvent is stripped with a solution containing at least enough ammonium carbonate to pecipitate the uranium complex. A portion of the uranium complex is recycled and the remainder can be collected and calcined to produce $U_3O_8$ or $UO_2$.

23 Claims, 1 Drawing Figure

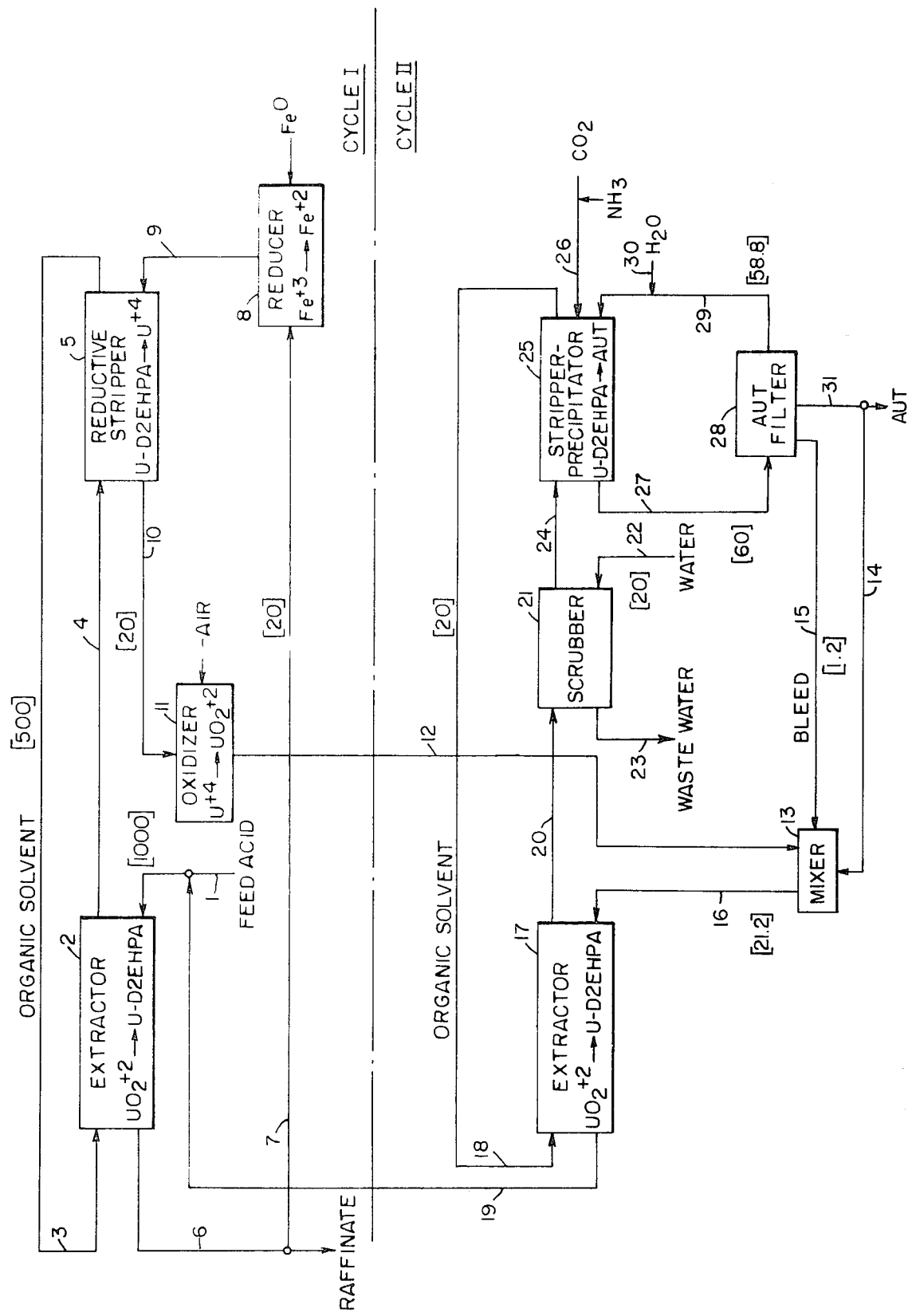

URANIUM COMPLEX RECYCLING METHOD OF PURIFYING URANIUM LIQUORS

BACKGROUND OF THE INVENTION

Fertilizer is made from phosphoric acid liquor, which incidentally contains significant amounts of uranium, typically about 0.2 g/l. In order not to waste the valuable uranium, a process has been developed by Oak Ridge National Laboratories to separate it from the acidic liquor which is contaminated with metal ions, principally iron in a typical amount of about 12 g/l. (See the article in I&EC Process Design and Development, Vol. II, page 122, January 1972 by F. J. Hurst, D. J. Crouse, and K. B. Brown titled "Recovery of Uranium from Wet-Process Phosphoric Acid." The same process is described in more detail by F. J. Hurst et al. in ORNL-TM-2522 Report entitled "Solvent Extraction of Uranium from Wet-Process Phosphoric Acid," April 1969. Also, see U.S., AEC Report ORNL 2952, June 30, 1960 by F. J. Hurst and D. J. Crouse titled "Recovery of Uranium from D2EHPA Extractant with $(NH_4)_2CO_3$."

This prior process is divided into two extraction cycles. In the first cycle the uranyl ion ($UO_2^{+2}$) and some ferric ion is extracted using di-2-ethylhexyl phosphoric acid (D2EHPA) and tri-n-octyl phosphine oxide (TOPO) in kerosene, the uranyl ion forming a complex with the D2EHPA and TOPO. The solvent is then stripped with a portion of the acid leaving the extractor and containing ferrous ions to produce a more concentrated acidic aqueous stream of ferric ions and $U^{+4}$ ions. The $U^{+4}$ ion is then oxidized with air to the uranyl ion.

In the second cycle of the prior process the concentrated acidic aqueous stream from the first cycle was again extracted with kerosene containing D2EHPA and TOPO, then stripped with water containing 2 to 2.5 moles/l $(NH_4)_2CO_3$ which would precipitate ammonium-uranyl-tricarbonate, $(NH_4)_4UO_2(CO_3)_3$, (AUT) and some ferric hydrate. The AUT could be recrystallized to purify it.

This process typically produced uranium containing 2 to 4% iron (based on the uranium) before recrystallization and recovered about 94% of the uranium in the feed. Ceramic grade uranium, which is used as fuel in reactors, requires no more than 0.04% iron (based on the uranium). (All percentages herein are by weight unless otherwise indicated.)

SUMMARY OF THE INVENTION

We have found that high purity uranium can be economically produced by recycling precipitated AUT to the second cycle aqueous liquor, so that the ratio of uranium to contaminating cations in the aqueous liquor is preferably at least about 3. This results in the preferential extraction of uranium which can be subsequently stripped and precipitated.

Preliminary experimental results indicate that the process of this invention can extract at least 99% of the uranium in the feed and can produce ceramic (i.e., nuclear reactor) grade uranium. The process also offers the advantage of separating uranium from any cation whose overall extraction coefficient is less than that of uranium, and therefore, is not as limited as other processes in this respect.

DESCRIPTION OF THE INVENTION

The accompanying drawing is a diagram illustrating a certain presently preferred process according to this invention. Typical flow rate ratios are given in the drawing in brackets and may be taken as gal/hr., gal/min., etc. The process is preferably at ambient temperature as that is least expensive. The process is described for continuous operation, but it is understood that adjustments may be needed in flow rates, concentrations, etc. during start-up.

CYCLE I

Referring to the drawing, in Cycle I feed acid from line 1 enters extractor 2. This feed is typically an aqueous solution of phosphoric and/or sulfuric acid having a pH of about 1 to about 2 and containing about 0.1 to about 0.5 g/l or uranium (as the uranyl ion, $UO_2^{+2}$) and about 7 to about 15 g/l of iron (as $Fe^{+++}$). In the extractor the feed acid is mixed with a water-immiscible, organic solvent from line 3 containing a reagent which reacts with the uranyl ions to form a complex soluble in the solvent. Typically, the solvent is kerosene in a 0.1 to 10 feed acid to solvent ratio (by volume) and it contains about 0.1 to 1 mole/l of D2EHPA and about 0.025 to about 0.25 moles/l of TOPO. The D2EHPA exists as the dimer $H([CH_3(CH_2)_7]_2PO_4)_2$. Two dimers react with a uranyl ion to form the complex $UO_2H_2([CH_3(CH_2)_7]PO_4)_4$, denoted herein as U-D2EHPA.

The solvent, containing complexed uranium and contaminates, passes through line 4 to reductive stripper 5. A portion of the raffinate from extractor 2 passes through lines 6 and 7 to reducer 8 where iron (Fe°) is added to reduce enough ferric ions to bring the ferrous ion concentration up to a concentration sufficient to reduce the uranyl ion to the $U^{+4}$ ion. The ferrous ion enters reductive stripper 5 by line 9 and is oxidized there to the ferric ion reducing the uranyl ion complexed with D2EHPA to the quadravalent $U^{+4}$ ion. While other reducing ions may be used to reduce the uranium to the $U^{+4}$ ion, the ferrous ion is preferred because of its low cost. The $U^{+4}$ ion is not complexed by D2EHPA and therefore enters the aqueous stream in line 10. The ratio of solvent in line 4 to raffinate in line 9 is typically about 40 to about 50. The organic solvent leaving the stripper is then recycled through line 3 to extractor 2.

Finally, the $U^{+4}$ ion in line 10 is oxidized, usually with air, to the uranyl ion in oxidizer 11 to enable the uranium to be extracted again in Cycle II. The product from Cycle I typically has a pH of about 1 to 2 and contains about 25 to 40 g/l iron and about 5 to 15 g/l uranium.

CYCLE II

The aqueous liquor entering Cycle II in line 12 should contain at least about 1 g/l of uranium in order for the process to collect practical quantities of uranium. Should the aqueous liquor contain less than 1 g/l of uranium, then Cycle I can be repeated until sufficient enrichment is obtained. The uranium is in the hexavalent state (i.e., the uranyl ion) and if it is not, it is oxidized to make it hexavalent. The aqueous liquor also contains contaminating cations. These cations may be any cations whose overall extraction efficiency is less than that of uranium, including analytical Group II and III metal ions, rare earths, vanadium, copper, nickel, molybdenum, and others. Most commonly the contaminating cation will be principally iron. The presence of chlorides, fluorides, and nitrates in the aqueous liquor interferes with the extraction by the organic solvent but small concentrations will not render the process inoperable. Typically, the aqueous liquor will contain phosphoric acid or sulfuric acid and have a pH of about 1 to 4; of the two, phosphoric acid is more common, and the process of this invention is particularly applicable to the phosphoric acid liquors.

Referring to the drawing, aqueous liquor in line 12 from Cycle I enters mixer 13 in Cycle II. In mixer 13 the aqueous liquor is mixed with sufficient AUT from line 14 to bring the weight ratio of U to contaminating cations in the liquor to, preferably, at least about 3. This ratio is regarded as important to the successful operation of the process since at lower ratios the extracted contaminants-to-uranium ratio is generally too high in the AUT product. The more preferred ratio, which produces a more efficient separation, is at least about 5. A ratio greater than about 10 is unnecessary and uneconomical. If phosphoric acid is present, the AUT is dissolved by the phosphoric acid forming ammonium phosphate which passes through line 19, extractor 2 and line 6. Thus, the process loses some ammonia, but since the phosphoric acid is used to make ammonium phosphate fertilizer anyway, no overall loss results. Also, in mixer 13 bleed from line 15 is added as needed to adjust the solids content of the liquor. From mixer 13 the aqueous liquor passes through line 16 to extractor 17. The liquor is mixed with a non-interfering, water-immiscible, organic solvent from line 18 containing a reagent which reacts with the uranyl ions in the liquid to form a complex soluble in the solvent. The solvent is preferably an aliphatic compound as the uranium complexes are very soluble in them and they aid in the extraction process. Kerosene, a mixture of linear hydrocarbons having 10 to 14 carbon atoms, is the preferred aliphatic compound as it is inexpensive and commercially available.

The reagent in the solvent used to form the uranium complex is preferably a di-alkyl phosphoric acid having 4 to 10 carbon atoms in each chain when the liquor is a phosphoric acid liquor. The preferred di-alkyl phosphoric acid is di-2-ethyl-hexyl phosphoric acid (D2EHPA) because it is very effective in extracting uranium. If the liquor is a sulfuric acid liquor or a sodium carbonate liquor, amines can be used as reagents. The concentration of reagent is typically about 0.1 to about 1 moles/l.

The size of the equipment required can be reduced, the amount of uranium extracted can be increased, and the phase separation between the aqueous liquor and the solvent can be improved if about 0.025 to about 0.25 mole/l of synergistic agent is included in the solvent. Synergistic agents are selected to be compatible with the reagent used as is known to the art. For example, if D2EHPA or a similar compound is the reagent, a trialkylphosphate, trialkylphosphonate, trialkylphosphinate or trialkylphosphine oxide can be used as a synergistic agent, where the alkyl chains are linear from $C_4$ to $C_{10}$. Tri-n-octyl phosphine oxide (TOPO) is preferred for use with D2EHPA as it is highly effective.

The feed ratio (by volume) of the aqueous liquor to the solvent is preferably greater than about 0.1 since, at ratios less than 0.1, the uranium is unnecessarily diluted in the solvent. The ratio of aqueous liquor to organic solvent in the liquid contactor (the internal ratio) should be maintained (by use of internal recycling, if necessary) at less than about 10 since at higher ratios, stable dispersions may form which make subsequent phase separation difficult. An internal ratio of about 0.5 to 1 seems to work best. When the feed ratio of the aqueous liquor to the solvent, (A/S), has been selected, the concentration of the reagent desired can be estimated. This estimate is made by first determining what the uranium saturation concentration in the solvent, $U_{SAT}$, will be using the formula:

$$U_{SAT} = \left( \frac{U_A}{L} \right) * \left( \frac{A}{S} \right)$$

where $U_A$ is the uranium concentration in the aqueous liquor and L is the loading selected. The loading is the concentration of uranium in the organic phase if complete extraction from the aqueous phase were achieved divided by the measured saturation concentration of uranium in the organic phase. As a practical matter, it is usually preferable to select L between about 0.5 to about 0.75 in order to extract almost all of the uranium into the organic phase. However, it could be shown that increased uranium purity can be achieved in the organic phase (and subsequently in the uranium product) by selecting loadings greater than 0.75 and even greater than 1. If such a loading is selected, relatively large percentages (i.e., greater than about 10%) of the uranium contained in the incoming aqueous liquor will remain unextracted in the raffinate. The raffinate is then recycled to the extractor in Cycle I. The loading L must be less than 1 in order to theoretically extract all of the uranium in the aqueous liquor, but as a practical matter, it is preferably about 0.5 to 0.6 (i.e., about 167 to 200% more than theoretically required to extract all of the uranium) to keeo a satisfactory rate of extraction, and even then about 1 to 2% of the uranium will not be extracted. Once the uranium saturation concentration in the solvent, $U_{SAT}$, is calculated, reference is made to a table to determine the concentration of reagent (or reagent plus synergistic agent) required to extract that concentration of uranium. The table is determined experimentally for the particular reagent (or reagent plus synergistic agent) used. For example, the following table of saturation values was experimentally determined for D2EHPA and TOPO in kerosene with respect to uranium in 5.3 M phosphoric acid.

| D2EHPA (M) | TOPO (M) | THEORETICAL U (g/l) | MEASURED U (g/l) |
|---|---|---|---|
| 0.50 | 0.125 | 30.00 | 26.94 |
| 0.75 | 0.190 | 45.00 | 39.17 |
| 1.00 | 0.250 | 60.00 | 52.16 |
| 1.25 | 0.313 | 75.00 | 62.81 |
| 1.50 | 0.375 | 90.00 | 73.78 |

The table also gives the theoretical U saturation value (calculated stoichiometrically) which is higher than the measured value due to inefficiencies in the extraction process. To illustrate the use of the formula and table, at an A/S ratio of 1, a loading L of 0.5, and a $U_A$ of 25 g/l the formula gives $U_{SAT} = 50$ g/l. Referring to the table, one would use 1 M D2EHPA with 0.250 M TOPO in the solvent.

Referring to the drawing, the aqueous liquor from extractor 17 is recycled through line 19 to extractor 2 in Cycle I. The organic solvent, containing complexed uranium contaminated with cations, leaves extractor 17 through line 20. If the aqueous liquor was acidic, the organic solvent in line 20 is preferably scrubbed with water in scrubber 21 to remove any acid entrainment which would increase the ammonia consumption in the stripper-precipitator 25. Water enters scrubber 21 by line 22 and waste water leaves by line 23. The scrubbed organic solvent then passes through line 24 to stripper-precipitator 25.

In the stripper-precipitator 25 the organic solvent is stripped with an aqueous solution containing enough ammonium carbonate, ammonium bicarbonate, or a mixture thereof from line 26 to precipitate a uranium complex. Ammonium carbonate is preferred to the bicarbonate as it is the compound that is complexed with uranium. Since, whenever ammonium carbonate is present the bicarbonate will also be present, "ammonium carbonate" will be used hereinafter as including ammonium bicarbonate. Generally, about 1.0 M ammonium carbonate is sufficient to precipitate AUT, although about 1.5 M to about 2.5 M ammonium carbonate is preferred for a typical process. The ratio (by volume) of aqueous solution to organic solvent is preferably about 0.5 to about 5 since it is difficult to operate outside of that range.

The preferred uranium complex is AUT as it is easier to filter. However, it is also possible to precipitate and recycle ammonium diuranate (ADU), a complex of hydrated uranyl hydroxide and a salt, for example, $$[UO_3(OH)_2;0.5(NH_4)_2CO_3;0.5H_2O].$$

The organic solvent is recycled through line 18. The aqueous slurry containing the precipitated AUT passes through line 27 to AUT filter 28 where AUT is filtered off. The AUT should be filtered from the slurry as quickly as possible to prevent the flocculation of ferric hydrate around it.

The filtrate is recycled through line 29 to stripper-precipitator 25. A portion of the filtrate, typically about 2 to about 5% (by volume) is used as bleed in line 15. A 0.5 M ammonium carbonate solution is added to line 29 as needed from line 30 to make up for water losses. A portion of the filter cake in line 31 sufficient to meet the previously described needs is sent through line 14. The remaining precipitated AUT can be calcined in an oven at about 350° to about 900°C which drives off carbon dioxide and ammonia. If the calcining is done in a reducing atmoshpere, such as a hydrogen-nitrogen mixture, $UO_2$ is obtained. If the calcining is done in an oxidizing atmosphere, such as air, the mixed oxide $U_3O_8$ is obtained.

The following example further illustrates this invention.

EXAMPLE

A synthetic acid feed was made up of 5.3 M phosphoric acid, 70 g/l of uranium (123.6 g/l $UO_2SO_4.3H_2O$) and 25.2 g/l of iron (119.0 g/l of $Fe_2(SO_4)_3.nH_2O$). The solvent used was 1 M D2EHPA - 0.25 M TOPO in kerosene. The phase ratio (aqueous/organic) used in the extractor (17 in drawing) was 1/2. The recycle ratio (line 14/line 30 in drawing) was 0.8 . Four clean separatory funnels were numbered 1 to 4 to represent the corresponding extractor equilibrium stages. Four gallons of the organic solvent containing no uranium or iron and 4 gallons of the acid liquor were prepared and stored in glass or plastic containers.

Extraction coefficients for both uranium and iron for each stage were calculated, based on data in the previouslycited article by Hurst. The uranium and iron compositions for each equilibrium stage was computed, using this data for the above acid feed.

These compositions were used to prepare four organic and four aqueous phase solutions corresponding to each stage, as an initial starting point. 200 ml. of the organic solution and 100 ml. of the aqueous solution corresponding to each stage was then pipetted into the respective numbered separatory funnels, shaken (wrist action at 50 shakes/min. for 5 minutes), and phases allowed to separate. The following table shows the numbering order for the funnels and the initial compositions used.

| Stage | SOLVENT U | Fe | AQUEOUS LIQUOR U | Fe |
|---|---|---|---|---|
| 1 | 35.00 | 0.177 | 29.1 | 25.2 |
| 2 | 14.70 | 0.177 | 7.73 | 25.2 |
| 3 | 3.788 | 0.177 | 1.165 | 25.2 |
| 4 | 0.505 | 0.174 | 0.155 | 24.9 |

The aqueous phase was then moved from stage i to stage (i + 1) for i = 1, 2, 3. The aqueous phase from the fourth stage was collected as the raffinate. The organic phase was moved from stage i to stage (i−1) for i = 4, 3, 2. The organic phase in stage 1 was collected as the extract. A single set of operations, shake, separate and shift, is denoted as a single pass. Thus, at the end of a pass, the fourth stage contains no organic phase and the first stage no aqueous phase. So, to complete the next pass, 200 ml. of fresh solvent was added to stage 4 and 100 ml. of acid liquor to the first stage. All volumetric measurements are pipetted out.

The first 30 passes were taken as the start-up period for the extractor to attain equilibrium. The extract and raffinate collected during this period were rejected. The next 15 passes were used to collect extract for further processing and analysis. The 46th pass was used to study phase properties and for analysis. This method has worked quite satisfactorily for the stripper (25 in drawing) as well.

The results obtained are tabulated in the following table. From the results, it can be seen that only two equilibrium stages were required to extract almost all the uranium. The third and fourth stages extracted mostly iron and little uranium because of the high iron loading. However, this extracted iron is displaced partially by the high uranium loading in the first and second stages. This would explain why the aqueous iron concentration is higher than in the feed. These phase separation characteristics were good in all four stages.

| Extractor Stage | Organic Phase | | Aqueous Phase | | Extraction Coefficients | |
|---|---|---|---|---|---|---|
| | U g/l | Fe g/l | U g/l | Fe g/l | $E_u^\circ$ | $E_{Fe}^\circ$ |
| 1 | 35.0 | 0.45 | 5.35 | 26.10 | 6.54 | 0.017 |

-continued

| Extractor Stage | Organic Phase U g/l | Fe g/l | Aqueous Phase U g/l | Fe g/l | Extraction Coefficients $E_u^o$ | $E_{Fe}^o$ |
| --- | --- | --- | --- | --- | --- | --- |
| 2 | 2.10 | 0.53 | 0.097 | 26.50 | 21.65 | 0.02 |
| 3 | 0.17 | 0.50 | 0.005 | 26.30 | 34.00 | 0.019 |
| 4 | <<0.01 | 0.495 | <<0.01 | 23.70 | — | 0.021 |

The solvent from the extractor was scrubbed with an equal volume of deionized water (pH - 6.5) to remove any $(PO_4)^{-3}$ ions in the solvent. The initial and final pH of the aqueous phase was measured. Since the water leaving is generally very acidic (pH - 2.5), no metal ion is lost during the scrubbing operation. The amount of phosphate ion extracted was calculated as 0.1 g/liter from the equilibrium equation for $(PO_4)^{-3}$ and $H^+$. Only a single stage was used for scrubbing the solvent.

The precipitator stripper 25 consisted of two stages. The scrubbed solvent was contacted with saturated ammonium carbonate in the first stage to strip the precipitate nearly all the uranium from the organic phase. The small amount of uranium in the organic phase leaving the first stage was stripped with 0.5 M ammonium carbonate in the second stage to obtain stripped solvent for recycle to the extractor. Since the best process parameters were not known for the first stage, uranium was precipitated using two different phase ratios: 1.0 and 2.0 in the first stage (with 1.0 in the second stage). One single stage precipitation was carried out using unscrubbed solvent and a phase ratio of 1.0.

Since D2EHPA reacts with ammonia with some release of $CO_2$ gas, closed separatory funnels were not used in this stripping operation. Each stage consisted of an open plastic container with a raked bottom to collect the precipitate. A ½-inch outlet at the bottom allowed the withdrawal of the precipitate with relative ease. Experience had shown that small openings are likely to be packed by the precipitate, rendering withdrawal difficult. Instead of the customary impeller type of mixer, an oscillatory perforated disc mixer was used. This mixer permitted an organic dispersion in a continuous aqueous phase. The disc and the shaft of the mixer were of polytetrafluoroethylene to avoid any contamination.

A fifteen minute time was used. It was observed in all cases, that the precipitation was quite rapid, with precipitate distributed in both phases. It was found that increased mixing time, in the type of mixer used, encourages the precipitate transfer to the aqueous phase, which in turn reduces settling time. Phase separation was found to require approximately 15 minutes. However, this is a strong function of the type, intensity and duration of mixing. The second stage of the stripper operated satisfactorily in all respects.

The precipitate obtained was filtered and dried overnight at 40°C. A small known weight of it was redissolved in phosphoric acid of known volume and analyzed for both uranium and iron. The results of analysis and the experimental conditions are summarized in the following table.

| EXPERIMENT NUMBER | STAGE | ORGANIC PHASE U g/l | AQUEOUS PHASE U g/l | AUT PRECIPITATE U% | Fe | REMARKS |
| --- | --- | --- | --- | --- | --- | --- |
| 1 | I* | 0.020 | 1.40 | 4.45 | 0.0040 | Unscrubbed solvent. Saturated $(NH_4)_2CO_3$. Phase ratio 1.0 |
| | | | | 4.45 | 0.0032 | |
| 2 | I** | 0.020 | 1.40 | 4.50 | 0.0064 | Scrubbed solvent. Saturated $(NH_4)_2CO_3$. Phase ratio 2.0 |
| | II | <0.01 | 0.30 | — | — | Scrubbed solvent. 0.5M $(NH_4)_2CO_3$. Phase ratio 1.0 |
| 3 | I** | 0.025 | 1.24 | 4.50 | 0.0080 | Scrubbed solvent. Saturated $(NH_4)_2CO_3$. Phase ratio 2.0 |
| | II | <0.01 | <0.03 | — | — | Scrubbed solvent. 0.5M $(NH_4)_2CO_3$. Phase ratio 1.0 |

**The phases were allowed to stand 48 hrs. after precipitation and before separation.
*Precipitate removed immediately after phase separation.
No analysis was made for the iron in the two phases.

For precipitate withdrawn immediately after phase separation in the ammonia stripper, the iron content based on uranium was 0.0809 percent and for the precipitates allowed to stand for approximately 48 hours in the settler, it was 0.16 percent. It is believed that ceramic grade uranium can be produced in the above experiment most easily by increasing the uranium to contaminate ratio to about 5. It is believed that ceramic grade uranium can also be obtained at a ratio of about 3 by washing the AUT filter cake with fresh ammonium carbonate solution.

We claim:
1. A method of separating uranium from an aqueous liquor containing uranyl ion and contaminating cations comprising:
   1. mixing said aqueous liquor with recycled uranium complex to form a solution of said uranium complex in said aqueous liquor;
   2. extracting said aqueous liquor with a non-interfering, water immiscible organic solvent containing a reagent which reacts with said uranyl ions forming a complex soluble in said solvent;
   3. stripping said organic solvent with an aqueous solution containing at least enough ammonium and carbonate ions to precipitate a uranium complex; and
   4. recycling a portion of said precipitated uranium complex to step (1).

2. A method according to claim 1 wherein said organic solvent in step (2) is recycled forming a first closed loop and the filtrate from step (3) is recycled to said aqueous solution forming a second closed loop.

3. A method according to claim 1 wherein about 2 to about 5% by volume of the filtrate from step (3) is mixed with said aqueous liquor in step (1).

4. A method according to claim 1 wherein said aqueous liquor is acidic, including between steps (2) and (3) the step of scrubbing said organic solvent with water.

5. A method according to claim 4 wherein said aqueous liquor initially has a pH of about 1 to about 4 and contains an acid selected from the group consisting of phosphoric acid, sulfuric acid, and mixtures thereof, at least about 400 ppm of said cations, and at least about 1 grams per liter of uranyl ion.

6. A method according to claim 5 wherein said acid is phosphoric acid.

7. A method of claim 1 wherein the concentration of said reagent is about 0.1 to about 1 mole/1 and it has the general formula:

where each R is an alkyl group from $C_4$ to $C_{10}$.

8. A method according to claim 7 wherein said reagent is di-2-ethyl-hexyl phosphoric acid.

9. A method according to claim 1 wherein said organic solvent contains about 0.025 to about 0.25 moles per liter of a synergistic agent.

10. A method according to claim 9 wherein said synergistic agent is tri-octyl phosphoric acid.

11. A method according to claim 1 wherein said solvent is an aliphatic compound.

12. A method according to claim 11 wherein said solvent is a linear hydrocarbon having 10 to 14 carbon atoms.

13. A method according to claim 1 wherein the weight ratio of uranium to said cations in step (1) is at least about 3.

14. A method according to claim 13 wherein the weight ratio of uranium to said cations in step (1) is about 5 to about 10.

15. A method according to claim 1 wherein the amount of said reagent is about 167 to about 200% more than theoretically required to extract all of said uranium.

16. A method according to claim 1 wherein the concentration of said ammonium and carbonate ions is about 1.5 to about 2.5 M.

17. A method according to claim 1 wherein said uranium complex is ammonium-uranyl-tricarbonate.

18. A method according to claim 1 wherein the ratio of said aqueous liquor to said organic solvent is about 0.1 to about 10.

19. A method according to claim 18 wherein the ratio of said aqueous liquor to said organic solvent is about 0.5 to 1.

20. A method according to claim 1 wherein the ratio of said aqueous solution to organic solvent in step (3) is about 0.5 to about 5.

21. A method according to claim 17 including the additional last step of calcining said ammonium-uranyl-tricarbonate which is not recycled at about 350° to about 900°C.

22. A method according to claim 21 wherein said calcining is done in a reducing atmosphere to produce $UO_2$.

23. A method according to claim 21 wherein said calcining is done in an oxidizing atmosphere to produce $U_3O_8$.

* * * * *

UNITED STATES PATENT AND TRADEMARK OFFICE
CERTIFICATE OF CORRECTION

PATENT NO. : 3,966,873
DATED : June 29, 1976
INVENTOR(S) : Leonard Elikan; Ward L. Lyon; Sundar Parameshwaran It is certified that error appears in the above-identified patent and that said Letters Patent are hereby corrected as shown below:

Claim 7, line 4, change the formula to:

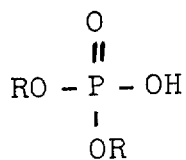

Signed and Sealed this

Eighth Day of February 1977

[SEAL]

Attest:

RUTH C. MASON
*Attesting Officer*

C. MARSHALL DANN
*Commissioner of Patents and Trademarks*